United States Patent [19]

Young et al.

[11] Patent Number: 4,802,765

[45] Date of Patent: * Feb. 7, 1989

[54] DIFFERENTIAL PLANE MIRROR HAVING BEAMSPLITTER/BEAM FOLDER ASSEMBLY

[75] Inventors: Peter S. Young; Gary E. Sommargren, both of Madison, Conn.

[73] Assignee: Zygo Corporation, Middlefield, Conn.

[*] Notice: The portion of the term of this patent subsequent to Sep. 15, 2004 has been disclaimed.

[21] Appl. No.: 91,284

[22] Filed: Aug. 28, 1987

Related U.S. Application Data

[63] Continuation of Ser. No. 873,406, Jun. 12, 1986, abandoned, which is a continuation-in-part of Ser. No. 845,925, Mar. 28, 1986.

[51] Int. Cl.[4] .................................... G01B 9/02
[52] U.S. Cl. ................................. 356/349; 356/351
[58] Field of Search .................. 356/349, 351, 358; 350/401

[56] References Cited

U.S. PATENT DOCUMENTS 3,656,853 4/1972 Bagley et al. .................. 356/349
4,566,761 1/1986 Carlsen et al. .................. 350/401
4,693,605 9/1987 Sommargren .................. 356/351

OTHER PUBLICATIONS

"Double-Passed Michelson Interferometer", Bennett, Optics Communications, vol. 4, No. 6, 2-1972, 428-430.

Primary Examiner—Vincent P. McGraw
Assistant Examiner—S. A. Turner
Attorney, Agent, or Firm—Bryan, Cave, McPheeters & McRoberts

[57] ABSTRACT

A differential plane mirror interferometer comprises a source (10) which emits a light beam containing two linear orthogonally polarized components; a beamsplitter/beam folder assembly (16, 16A) for converting the input beam into two separated, parallel, orthogonally polarized beams; a half-wave retardation plate (29A, 29) located in one of the separated beams to produce two separated parallel beams with the same polarization; means including a polarizing beamsplitter (44), for causing each of the separated parallel beams with the same polarization to be reflected twice by one of two plane mirrors (71, 70) to produce two parallel output beams with the same polarization; a half-wave retardation plate (29B, 29) located in one of the separated parallel output beams, with the beamsplitter/beam folder assembly (16, 16B) converting the two separated parallel orthogonally polarized output beams into a single output beam in which the phase difference between the two polarization components of the single output beam is directly proportional to the optical path length between the two plane mirrors (70, 71); a polarizer (81) for mixing the orthogonal components of the output beam; a photoelectric detector (83) to produce the measurement signal; and an electronic module (90) to indicate the phase difference which is directly proportional to the changes in the optical path length between the two plane mirrors.

52 Claims, 2 Drawing Sheets

DIFFERENTIAL PLANE MIRROR HAVING BEAMSPLITTER/BEAM FOLDER ASSEMBLY

CROSS REFERENCE TO RELATED APPLICATIONS

This application is a continuation of U.S. patent application Ser. No. 873,406, filed June 12, 1986, now abandoned, which is a continuation-in-part of our copending U.S. patent application entitled "Differential Plane Mirror Interferometer Having Beamsplitter/Beam Folder Assembly," filed Mar. 28, 1986, and bearing U.S. Ser. No. 845,925, and is related to commonly owned U.S. patent application entitled "Differential Plane Mirror Interferometer," filed Dec. 19, 1985, and bearing U.S. Ser. No. 810,999, and the contemporaneously filed commonly owned application also entitled "Differential Plane Mirror Interferometer" which is a continuation-in-part of U.S. Ser. No. 810,999 the contents of all of which are specifically incorporated by reference herein in their entirety.

BACKGROUND OF THE INVENTION

1. Field of the Invention

The present invention relates to apparatus for the measurement of optical path length changes between two plane mirror surfaces. More particularly, the invention relates to optical apparatus which is useful for high accuracy displacement metrology using interferometry.

2. The Prior Art

An interferometer is a basic instrument for most high accuracy displacement measurements in dilatometry, material stability studies, the machine tool industry, and in the semiconductor fabrication industry. One type of interferometer representative of the current state-of-the-art is the differential plane mirror interferometer which measures the optical path length changes between two external mirrors and which is described in R. R. Baldwin and G. J. Siddall, "A double pass attachment for the linear and plane interferometer," *Proc. SPIE*, Vol. 480, pp. 78–83 (May 1984). A conventional differential plane mirror interferometer consists of a fixed plane mirror and a movable plane mirror, which form the interferometer cavity, and auxiliary optical components (retroreflectors, wave plates, mirrors, beamsplitters). This type of interferometer has an inherent optical resolution of one quarter of the wavelength of the light used and has particularly high stability which is necessary for the ever increasing demand for improved accuracy. Thus, it is particularly insensitive to any tilt of the plane mirrors and motion of the auxiliary optic components.

References, M. Okaji and H. Imai, "High-Resolution Multifold Path Interferometers for Dilatometric Measurements," *J. Phys. E: Scientific Instruments*, Volume 16, pp. 1208–1213, 1983, and M. Okaji and H. Imai, "A Practical Measurement System for the Accurate Determination of Linear Thermal Expansion Coefficients," *J. Phys., E: Scientific Instruments*, Vol. 17, pp 669–673, 1984, illustrate other embodiments of differential plane mirror interferometers.

The conventional differential plane mirror interferometer is, however, overly complicated, requiring many auxiliary optical components thereby subjecting the measurement beams to many reflections. These drawbacks ultimately limit the accuracy that can be achieved due to a lower signal-to-noise ratio in the measurement signal as a result of reduced optical beam power and polarization leakage.

In commonly owned, copending U.S. patent application Ser. No. 810,999, entitled "Differential Plane Mirror Interferometer", filed Dec. 19, 1985, and the aforementioned contemporaneously filed U.S. patent application which is a continuation in part thereof, the contents of both of which are specifically incorporated by reference herein, an improved differential plane mirror interferometer is disclosed in which the use of a shear plate not only reduces the number of optical elements but also reduces the number of reflections by nearly 50%.

The present invention retains the basic plane mirror interferometer cavity of the conventional differential plane mirror and the simplicity of the copending shear plate interferometer described in the aforementioned copending U.S. patent application Ser. No. 810,999 and aforementioned continuation in part thereof; however, it uses a beamsplitter/beam folder assembly to generate and recombine two separated, parallel, orthogonally polarized beams instead of the previously disclosed shear plate. Since the optical efficiency of the prism elements of the present invention can be higher than that of the previously disclosed shear plate, the signal-to-noise ratio and, thus, the number of interferometers which can be used with a single laser source can be greater with this type of system.

SUMMARY OF THE INVENTION

In accordance with the instant invention, we provide a differential plane mirror interferometer system capable of measuring accurately either changes in length or changes in optical length comprising: (1) a source of an input beam with two linear orthogonally polarized components which may or may not be of the same optical frequency; (2) means, most preferably a beamsplitter/beam folder assembly, for converting said input beam into two separated, parallel, orthogonally polarized beams; (3) means, most preferably a half-wave retardation plate, located in one of said separated beams, for converting said two separated, parallel, orthogonally polarized beams into two separated, parallel, beams with the same polarization; (4) means, most preferably a polarizing beamsplitter, quarter-wave retardation plate, and retroreflector, for causing each of said separated, parallel beams with the same polarization to be reflected twice by one of two plane mirrors, respectively, to produce two parallel output beams with the same polarization; (5) means most preferably a half-wave retardation plate, located in one of said separated, parallel output beams for converting said two separated parallel output beams of the same polarization into two separated, parallel output beams with orthogonal polarization; (6) means, most preferably a beamsplitter/beam folder assembly, for converting said two separated, parallel, orthogonally polarized output beams into a single output beam in which the phase difference between the two polarization components of said single output beam is directly proportional to the optical path length between said two plane mirrors; (7) means, most preferably a polarizer, for mixing said orthogonal components of said single output beam; (8) means, most preferably a photoelectric detector, to produce an electrical measurement signal; and (9) means to extract said phase difference from said electrical measurement signal, said extracted phase difference being proportional to the optical path length change between the two plane mirrors.

THE DRAWINGS

DETAILED DESCRIPTION OF THE INVENTION

Figure 1:
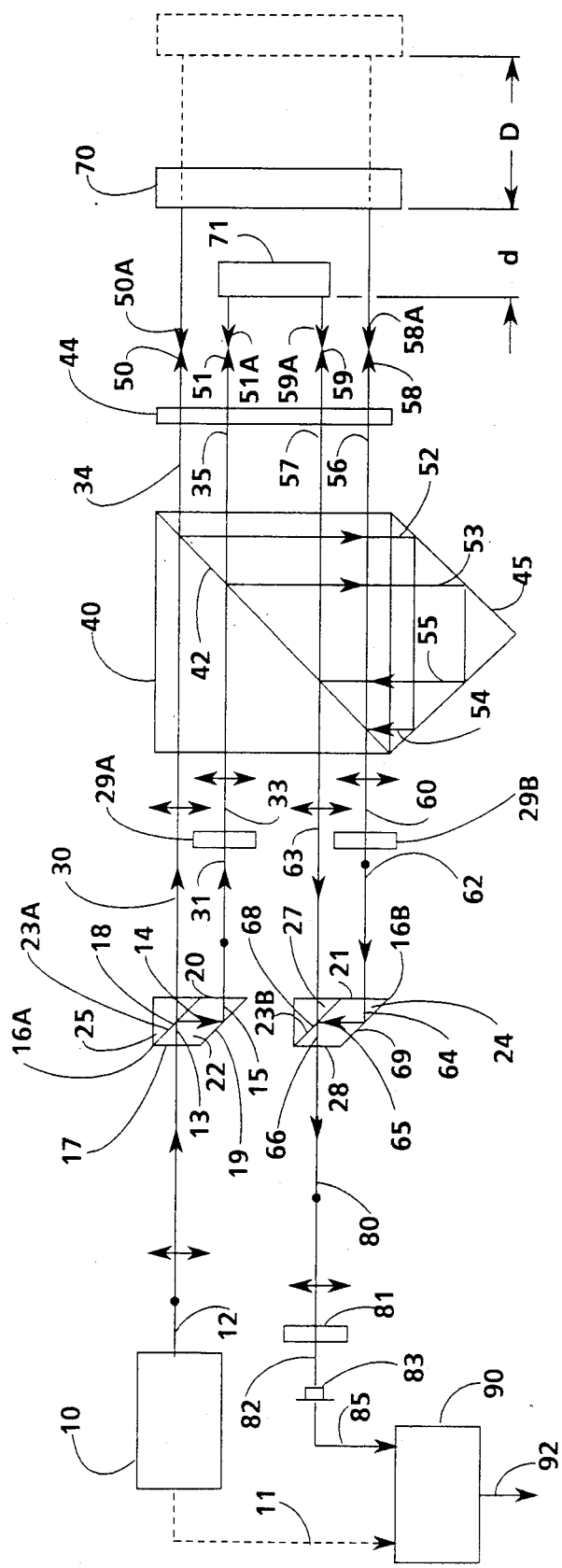
FIG. 1 depicts in schematic form one embodiment of the instant invention where all optical beams are in a single plane.

FIG. 1 depicts in schematic form one embodiment of the instant invention where all optical beams are in a single plane. While the apparatus has application for a wide range of radiation sources, the following description is taken by way of example with respect to an optical measuring system. Light source (10), which most preferably uses a laser, emits input beam (12) which is comprised of two linear orthogonally polarized components as indicated by the dot and arrow, which may or may not be of the same optical frequency. If the frequencies are the same, see for example, Downs et al. U.S. Pat. No. 4,360,271, issued Nov. 23, 1982, and the contemporaneously filed copending U.S. patent application entitled "Differential Plane Mirror Interferometer" which is a continuation in part of U.S. Ser. No. 810,999. If the frequencies are different, see for example, Bagley et al. U.S. Pat. No. 3,458,259 issued July 26, 1969 and commonly owned, copending U.S. patent applications Serial Nos. 710,859, entitled "Apparatus to Transform a Single Frequency, Linearly Polarized Laser Beam Into a Beam with Two, Orthogonally Polarized Frequencies" filed Mar. 12, 1985; 710,928, entitled "Heterodyne Interferometer System", filed Mar. 12, 1985; and 710,927, entitled "Apparatus to Transform a Single Frequency, Linearly Polarized Laser Beam into a High Efficiency Beam with Two, Orthogonally Polarized Frequencies", filed Mar. 12, 1985; and 810,999, entitled "Differential Plane Mirror Interferometer", filed Dec. 19, 1985, all of which are specifically incorporated by reference herein in their entirety, in which instance source (10) would provide an electrical reference signal (11), shown by dotted lines in FIG. 1, which would correspond to the frequency difference between the two stabilized frequencies. No such reference signal (11) is provided when the two linear orthogonally polarized components comprising input beam (12) are of the same optical frequency.

Beam (12) is incident on the first beamsplitter/beam folder assembly (16A). Beamsplitter/beam folder assembly (16A) is comprised of right angle prism (25) and rhomboid prism (22). The function of beamsplitter/beam folder assembly (16A) is to spatially separate the two polarization components using conventional polarization techniques into two parallel beams. Beam (12) passes through surface (17) to become beam (13) which has the same polarization as beam (12). Surface (17) has an antireflection coating over the region where beam (12) passes through it. Polarizing coating (23A) on surface (18) splits beam (13) so that one polarized component is transmitted as beam (30) whereas the other orthogonally polarized component is reflected as beam (14). Beam (14) is reflected by surface (19) with its state of polarization unaltered to become beam (15). Beam (15) passes through surface (20) to become beam (31) which has the same polarization as beam (15) and which is parallel to beam (30). Surface (20) has an antireflection coating over the regions where beams pass through it.

Beam (31) passes through half-wave retardation plate (29A) which rotates the linear polarization of beam (31) by 90° so that resultant beam (33) has the same polarization as beam (30). Beams (30) and (33) enter polarizing beamsplitter (40) with polarizing coating (42) and are transmitted as beams (34) and (35) respectively. Beams (34) and (35) pass through quarter-wave retardation plate (44) and are converted into circularly polarized beams (50) and (51) respectively. Beam (51) is reflected from fixed reference mirror (71) to become beam (51A) while beam (50) is reflected from movable mirror (70) affixed to the stage whose relative position is being measured to become beam (50A). Beams (50A) and (51A) pass through quarter-wave retardation plate (44) and are converted back into linearly polarized beams which are orthogonally polarized to the original incident beams (34) and (35). Beams (50A) and (51A) are reflected by polarizing coating (42) to become beams (52) and (53). Beams (52) and (53) are reflected by retroreflector (45) to become beams (54) and (55). Beams (54) and (55) are reflected by polarizing coating (42) to become beams (56) and (57). Beams (56) and (57) pass through quarter-wave retardation plate (44) and are converted into circularly polarized beams (58) and (59).

Beam (59) is reflected from fixed reference mirror (71) to become beam (59A) while beam (58) is reflected from movable mirror (70) to become beam (58A). Beams (58A) and (59A) pass back through quarter-wave retardation plate (44) and are converted back into linearly polarized beams which are polarized the same as the original incident beams (34) and (35). Beams (58A) and (59A) are transmitted by polarized coating (42) and leave polarizing beamsplitter (40) as beams (60) and (63). Beams (60) and (63) are mutually parallel by virtue of the inherent optical properties of retroreflector (45), independent of any tilt that may be present between mirrors (70) and (71). Beam (60) passes through half-wave retardation plate (29B) which rotates the linear polarization of beam (60) by 90° so that resultant beam (62) has a linear polarization which is orthogonal to beam (63). The function of the second beamsplitter/beam folder assembly (16B) is to recombine the two parallel, separated beams using conventional polarization techniques thereby accomplishing the inverse on the return leg of what was accomplished by the first beamsplitter/beam folder assembly (16A) on the input leg. Similarly, beamsplitter/beam folder assembly (16B), like beamsplitter/beam folder assembly (16A), is comprised of right angle prism (27) and rhomboid prism (24). Beam (62) passes through surface (21) to become beam (64) which has the same polarization as beam (62). Surface (21) has an antireflection coating over the regions where beams pass through it. Beam (64) is totally reflected by surface (69) with its state of polarization unaltered to become beam (65). Beams (65) and (63) are recombined to form beam (66) by polarizing coating (23B). Surface (68) has polarizing coating (23B) over the region where beams (65) and (63) intersect. Beam (66) passes through surface (28) to become beam (80). Surface (28) has an antireflection coating over the region where beam (66) passes through it.

Beam (80), like input beam (12), has two polarization components which are orthogonally polarized. Each polarization component has traversed exactly the same optical path length (through air and glass) except for the optical path, "nd", between mirrors (70) and (71) where "n" is the index of refraction of the medium between mirrors (70) and (71) and "d" is the distance between mirrors (70) and (71). The optical path length, "nd", corresponding to this distance, "d", results in a phase difference between the two polarization components of beam (80). Motion of mirror (70) causes this phase difference to vary. This phase variation is directly proportional to the distance, "D", moved by mirror (70) for a constant "n" and is measured by passing beam (80) through polarizer (81), oriented at 45° to each polarization component, which mixes the two orthogonally polarized components in beam (80) to give beam (82). Similarly, if "d" is fixed and "n" varies, then the phase variation is directly proportional to the change in "n". The interference between the two polarization components is detected by photodetector (83) producing electrical signal (85). Electronic module (90) extracts the phase variation from electrical signal (85). When the two polarization components of beam (12) are of the same optical frequency, module (90) does not require reference signal (11), since there is no corresponding frequency difference, and it conventionally extracts the phase variation from signal (85) such as in the manner disclosed in U.S. Pat. No. 4,360,271. However, when the two polarization components of beam (12) are of different frequencies, an additional sinusoidal electrical reference signal (11) equal in frequency to the difference between the two optical frequencies is required by electronic module (90), which reference signal (11), as previously mentioned, would be provided from source (10) in which instance photodetector (83) would detect the interference between the two frequency components as a sinusoidal intensity variation with a frequency approximately equal to the difference frequency between the two components of beam (12), such as described in the aforementioned commonly owned co-pending U.S. patent applications Ser. Nos. 710,928, and 810,999, and electronic module (90) would preferably comprise a phase meter/accumulator, such as described in said applications. In either event, electronic module (90) provides output (92) which is directly proportional to the change in optical path length between mirrors (70) and (71). This optical configuration is extremely insensitive to measurement error because changes in the other optical components, such as those induced mechanically or thermally, affect both polarization components equally and therefore have no influence on the measured phase variation (92). In addition, environmental effects, such as variations in the refractive index of air, can be minimized by placing mirror (71) close to mirror (70) to reduce the optical path length difference between the two polarization components. It should be noted that half-wave retardation plates (29A) and (29B) could be a single element with a hole in it to allow beam (63) to pass through it unaffected. In any event, the presently preferred beamsplitter/beam folder assembly (16A) for the input leg converts the single input beam into two parallel output beams (30) and (31) which have the same polarization as the input beam (12) but are spatially offset from each other, while beamsplitter/beam folder assembly (16B) performs the inverse for the return leg in the presently preferred differential plane mirror interferometer. If desired, a single beamsplitter/beam folder assembly could be constructed to functionally perform the operations of the two beamsplitter/beam folder assemblies (16A) and (16B) without departing from the spirit and scope of the present invention, such as illustrated in the embodiment of FIG. 2.

Figure 2:
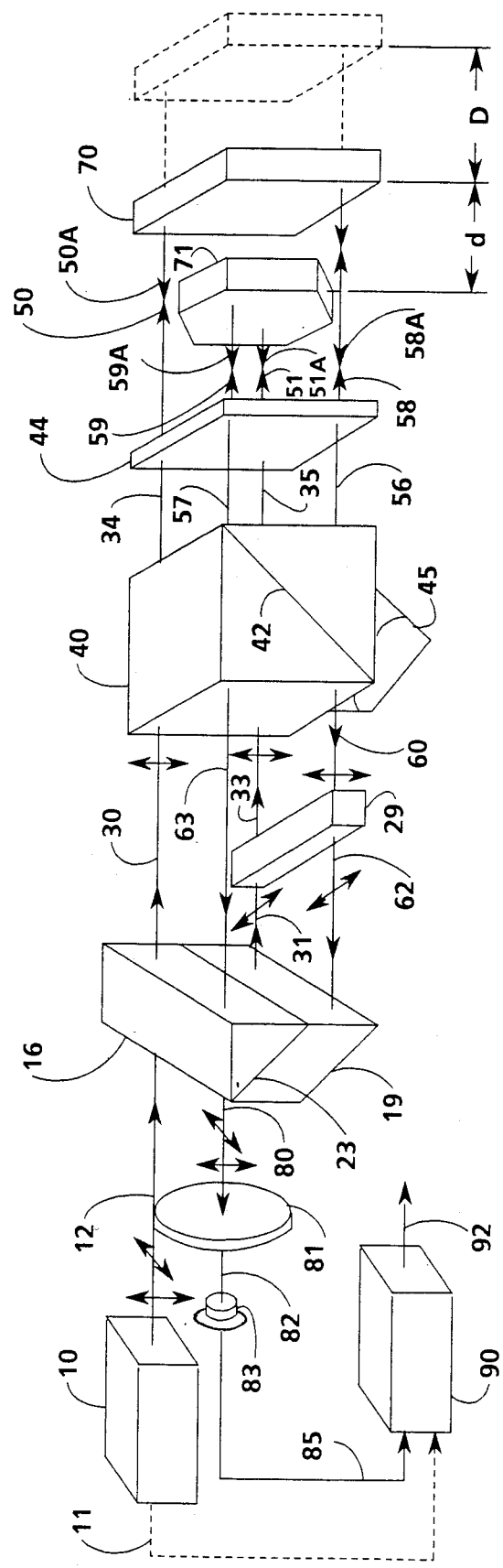
FIG. 2 depicts in schematic form a second embodiment of the instant invention where the optical beams are not in a single plane.

FIG. 2 depicts in schematic form a second embodiment of the instant invention where the optical beams are not in a single plane. This configuration permits a more compact optical system. The description of this figure is identical to FIG. 1 and is numbered correspondingly. The only differences are that now the two beamsplitter/beam folder assemblies (16A) and (16B) illustrated in the embodiments of FIG. 1 are replaced by a single beamsplitter/beam folder assembly (16) and the two half-wave retardation plates (29A) and (29B) illustrated in the embodiment of FIG. 1 are replaced by a single half-wave retardation plate (29).

Thus, in FIG. 2, light source (10), which as previously mentioned, most preferably uses a laser, emits input beam (12) which is comprised of two linear orthogonally polarized components as indicated by the two arrows, which, again, may or may not be of the same optical frequency. Just as was mentioned with reference to FIG. 1, when the two linear orthogonally polarized components of beam (12) differ in frequency, source (10) provides an electrical signal (11), shown by dotted lines in FIG. 2, corresponding to this frequency difference, with no such reference signal (11) being provided when the two linear orthogonally polarized components comprising input beam (12) are of the same optical frequency. Beam (12) is incident on the single beamsplitter/beam folder assembly (16). The function of beamsplitter/beam folder assembly (16) is the same as for the beamsplitter/beam folder assembly (16B) of FIG. 1, namely to spatially separate the two polarization components in beam (12) using conventional polarization techniques. Thus, in the embodiment of FIG. 2, beam (12) is divided by beamsplitter/beam folder assembly (16) with aid of antireflection coatings on the entrance and exit surfaces, polarizing coating (23) and surface (19) to become vertically polarized beam (30) and horizontally polarized beam (31). Beam (31) passes through the single half-wave retardation plate (29) which rotates the linear polarization of beam (31) by 90° so that resultant beam (33) has the same polarization as beam (30). Beams (30) and (33) enter polarizing beamsplitter (40) with polarizing coating (42) and are transmitted as beams (34) and (35) respectively. Beams (34) and (35) pass through quarter-wave retardation plate (44) and are converted into circularly polarized beams (50) and (51) respectively. Beam (51) is reflected from fixed reference mirror (71) to become beam (51A) while beam (50) is reflected from movable mirror (70) affixed to the stage whose relative position is being measured to become (50A). Beams (50A) and (51A) pass back through quarter-wave retardation plate (44) and are converted back into linearly polarized beams that are orthogonally polarized to the original incident beams (34) and (35). Beams (50A) and (51A) are reflected by polarizing coating (42) retroreflector (45), and polarizing coating (42) a second time to become beams (56) and (57). Beams (56) and (57) pass through quarter-wave retardation plate (44) and are converted into circularly polarized beams (58) and (59). Beam (59) is reflected from fixed reference mirror (71) to become beam (59A) while beam (58) is reflected from movable mirror (70) to become beam (58A). Beams (58A) and (59A) pass back through quarter-wave retardation plate (44) and are converted back into linearly polarized beams that are polarized the same as the original incident beams (34) and (35). Beams (58A) and (59A) are transmitted by polarized coating (42) and leave polarizing beamsplitter (40) as beams (60) and (63). Beams (60) and (63) are mutually parallel by virtue of the inherent optical properties of retroreflector (45), independent of any tilt that may be present between mirrors (70) and (71). Beam (60) passes through the single half-wave retardation plate (29) which rotates the linear polarization of beam (60) by 90° so that resultant beam (62) has a linear polarization which is orthogonal to beam (63). Beams (62) and (63) are combined by beamsplitter/beam folder assembly (16) in the same manner as accomplished by beamsplitter/beam folder assembly (16B) of FIG. 1, with the aid of antireflection coatings on the entrance and exit surfaces, polarizing coating (23) and surface (19) to become beam (80).

Once again beam (80), in the embodiment of FIG. 2, like input beam (12), has two polarization components which are orthogonally polarized. Each polarization component, as was true with the FIG. 1 embodiment, has traversed exactly the same optical path length (through air and glass) except for the optical path, "nd", between mirrors (70) and (71) where "n" is the index of refraction of the medium between mirrors (70) and (71) and "d" is the distance between mirrors (70) and (71). The optical path length corresponding to this distance, "d", results in a phase difference between the two polarization components of beam (80). Motion of mirror (70) causes this phase difference to vary. This phase variation is directly proportional to the distance, "D", moved by mirror (70) for a constant "n" and is measured by passing beam (80) through polarizer (81), oriented at 45° to each polarization component, which mixes the two orthogonally polarized components in beam (80) to give beam (82). Similarly, if "d" is fixed and "n" varies, then the phase variation is directly proportional to the change in "n". As was also true on the FIG. 1 embodiment, the interference between the two frequency components is detected by photodetector (83) producing electrical signal (85). When the two polarization components of beam (12) are of the same optical frequency, module (90) does not require reference signal (11), since there is no corresponding frequency difference, and it conventionally extracts the phase variation from signal (85) such as in the manner disclosed in U.S. Pat. No. 4,360,271. However, when the two polarization components of beam (12) are of different frequencies, an additional sinusoidal electrical reference signal (11) equal in frequency to the difference between the two optical frequencies is required by electronic module (90), which reference signal (11), as previously mentioned, would be provided from source (10) in which instance photodetector (83) would detect the interference between the two frequency components as a sinusoidal intensity variation with a frequency approximately equal to the difference frequency between the two components of beam (12), such as described in the aforementioned commonly owned copending U.S. patent application Ser. Nos. 710,928 and 810,999, and electronic module (90) would preferably comprise a phase meter/accumulator, such as described in said applications. In either event, electronic module (90) provides output (92) which as previously mentioned with respect to FIG. 1 embodiment, is directly proportional to the change in optical path length "nd", between mirrors (70) and (71). Thus, both the FIGS. 1 and 2 embodiments employ optical configurations which are extremely insensitive to measurement error because changes in the other optical components, such as those induced mechanically or thermally, affect both polarization components equally and therefore have no influence on the measured phase variation (92). In addition, as was previously mentioned with reference to the FIG. 1 embodiment, environmental effects, such as variations in the refractive index of air, can be minimized by placing mirror (71) close to mirror (70) to reduce the optical path length difference between the two polarization components.

The principal advantages of the instant invention are: (1) fewer number of optical components, (2) simpler beam paths, (3) fewer reflections, (4) greater light throughput efficiency, (5) smaller wavefront distortion, (6) reduced optical leakage, (7) reduced non-linearity errors, and (8) lower cost.

While a preferred embodiment of the invention has been disclosed, obviously modification can be made therein, without departing from the scope of the invention as defined in the following claims.

What is claimed is:

1. A differential plane mirror interferometric system comprising: a pair of plane mirrors separable by a variable optical path length; source means for emitting an input beam comprising two stabilized orthogonally polarized optical frequencies; means optically coupled to said input beam for converting said input beam into two separated parallel orthogonally polarized beams; means optically disposed in the path of one of said two separated parallel orthogonally polarized beams for converting said two separated parallel orthogonally polarized beams into two separated parallel beams same polarized beams for causing one of said two separated parallel same polarized beams to be reflected twice by one of said pair of plane mirrors and the other of said two separated parallel same polarized beams to be reflected by the other of said pair of plane mirrors to produce two parallel output beams having the same polarization means optically disposed in the path of one of said two separated same polarized parallel output beams for converting said two separated same polarized parallel output beams into two separated orthogonally polarized parallel output beams; means optically coupled to said two separated parallel orthogonally polarized output beams for converting said two separated parallel orthogonally polarized output beams into a single output beam having a pair of orthogonally polarized frequency components, with a phase difference therebetween being directly proportional to said variable optical path length between said pair of plane mirrors; means optically coupled to said single output beam for mixing said orthogonally polarized components thereof and producing an electrical measurement signal therefrom; and means operatively connected to said electrical measurement signal for extracting a difference in phase from said electrical measurement signal, said extracted phase difference being proportional to said variable optical path length between said pair of plane mirrors; whereby an optical configuration extremely insensitive to measurement error and misalignment is provided for said interferometric system, said means for converting said input beam into two separated parallel orthogonally polarized beams comprising a beamsplitter/beam folder assembly means, said beamsplitter/beam folder assembly means comprising first set of regions of antireflection and polarizing coatings, said means for converting said input beam into said separated parallel orthogonally polarized output beams comprising said beamsplitter/beam folder assembly means first set of regions and coatings.

2. A differential plane mirror interferometric system in accordance with claim 1 wherein said source means emits said input beam comprising two stabilized orthogonally polarized optical frequencies which are of the same frequency value.

3. A differential plane mirror interferometric system in accordance with claim 1 wherein said beamsplitter/beam folder assembly means comprises a right angle prism and a rhomboid prism.

4. A differential plane mirror interferometric system in accordance with claim 2 wherein said beamsplitter/beam folder assembly means comprises a right angle prism and a rhomboid prism.

5. A differential plane mirror interferometric system in accordance with claim 1 wherein said means for converting said two separated parallel orthogonally polarized beams into said two same polarized separated parallel beams comprises a half-wave retardation plate means.

6. A differential plate mirror interferometric system in accordance with claim 2 wherein said means for converting said two separated parallel orthogonally polarized beams into said two same polarized separated parallel beams comprises a half-wave retardation plate means.

7. A differential plane mirror interferometric system in accordance with claim 1 wherein said means for causing each of said separated parallel same polarized beams to be reflected twice by one of said pairs of plane mirrors comprises a polarizing beamsplitter means and a retroreflector means.

8. A differential plane mirror interferometric system in accordance with claim 7 wherein said means for causing each of said separated parallel same polarized beams to be reflected twice by one of said pairs of plane mirrors further comprises a quarter-wave retardation plate means.

9. A differential plane mirror interferometric system in accordance with claim 2 wherein said means for causing each of said separated parallel same polarized beams to be reflected twice by one of said pairs of plane mirrors comprises a polarizing beamsplitter means and a retroreflector means.

10. A differential plane mirror interferometric system in accordance with claim 9 wherein said means for causing each of said separated parallel same polarized beams to be reflected twice by one of said pairs of plane mirrors further comprises a quarter-wave retardation plate means.

11. A differential plane mirror interferometric system in accordance with claim 1 wherein said means for converting said two separated parallel same polarized output beams into said two separated parallel orthogonally polarized output beams comprises a hlaf-wave retardation plate means.

12. A differential plane mirror interferometric system in accordance with claim 2 wherein said means for converting said two separated parallel same polarized output beams into said two separated parallel orthogonally polarized output beams comprises a half-wave retardation plate means.

13. A differential plane mirror interferometric system in accordance with claim 1 wherein said means for producing said electrical measurement signal comprises a polarizer means for mixing said single output beam orthogonal components.

14. A differential plane mirror interferometric system in accordance with claim 6 wherein said means for producing said electrical measurement signal further comprises a photoelectric detector.

15. A differential plane mirror interferometric system in accordance with claim 2 wherein said means for producing said electrical measurement signal comprises a polarizer means for mixing said single output beam orthogonal components.

16. A differential plane mirror interferometric system in accordance with claim 15 wherein said means for producing said electrical measurement signal further comprises a photoelectric detector.

17. A differential plane mirror interferometric system in accordance with claim 1 wherein said means for producing said electrical measurement signal comprises a photoelectric detector.

18. A differential plane mirror interferometric system in accordance with claim 2 wherein said means for producing said electrical measurement signal comprises a photoelectric detector.

19. A differential plane mirror interferometric system in accordance with claim 1 wherein the distance between said pair of plane mirrors is fixed for providing the variations in the index of refraction of the medium between said pair of plane mirrors.

20. A differential plane mirror interferometric system in accordance with claim 3 wherein the distance between said pair of plane mirrors is fixed for providing the variations in the index of refraction of the medium between said pair of plane mirrors.

21. A differential plane mirror interferometric system in accordance with claim 1 wherein said beamsplitter/beam folder assembly means further comprises a second set of regions of antireflection and polarizing coatings, said means for converting said two separated parallel orthogonally polarized output beams into said single output beam comprising said beamsplitter/beam folder assembly means second set of regions and coatings.

22. A differential plane mirror interferometric system in accordance with claim 21 wherein said first and second regions of polarizing coatings comprise different portions of a common polarizing coating, said beamsplitter/beam folder assembly means comprising a common beamsplitter/beam folder assembly for converting said input beam and said output beam in said differential plane mirror interferometric system.

23. A differential plane mirror interferometric system in accordance with claim 22 wherein said common beamsplitter/beam folder assembly comprises beam entrance and exit surfaces, said first and second regions of antireflection coatings being on said entrance and exit surfaces.

24. A differential plane mirror interferometric system in accordance with claim 23 wherein said beamsplitter/beam folder assembly means comprises a right angle prism and a rhomboid prism.

25. A differential plane mirror interferometric system in accordance with claim 22 wherein said beamsplitter/beam folder assembly means comprises a right angle prism and a rhomboid prism.

26. A differential plane mirror interferometric system in accordance with claim 21 wherein said beamsplitter/beam folder assembly means comprises a right angle prism and a rhomboid prism.

27. A differential plane mirror interferometric system in accordance with claim 21 wherein said means for converting said two separated parallel orthogonally polarized beams into said two same polarized separated parallel beams comprises a half-wave retardation plate means.

28. A differential plane mirror interferometric system in accordance with claim 21 wherein said means for causing each of said separated parallel same polarized beams to be reflected twice by one of said pairs of plane mirrors comprises a polarizing beamsplitter means and a retroreflector means.

29. A differential plane mirror interferometric system in accordance with claim 28 wherein said means for causing each of said separated parallel same polarized beams to be reflected twice by one of said pairs of plane mirrors further comprises a quarter-wave retardation plate means.

30. A differential plane mirror interferometric system in accordance with claim 27 wherein said means for converting said two separated parallel same polarized output beams into said two separated parallel orthogonally polarized output beams comprises a half-wave retardation plate means.

31. A differential plane mirror interferometric system in accordance with claim 21 wherein said source means comprises a laser.

32. A differential plane mirror interferometric system in accordance with claim 21 wherein one of said pair of plane mirrors is fixed and comprises a reference lmirror and the other of said pair of plane mirrors is movable for providing said variable distance between said pair of separable plane mirrors.

33. A differential plane mirror interferometric system in accordance with claim 32 wherein said source means comprises a laser.

34. A differential plane mirror interferometric system in accordance with claim 21 wherein all of said beams are optical beams, said optical beams being in a plurality of planes, with a given optical beam being in a given plane.

35. A differential plane mirror interferometric system in accordance with claim 34 wherein said source means comprises a laser.

36. A differential plane mirror interferometric system in accordance with claim 21 wherein the distance between said pair of plane mirrors is fixed for providing the variation in the index of refraction.

37. A differential plane mirror interferometric system in accordance with claim 3 wherein said beamsplitter/beam folder assembly means further comprise a second set of regions of antireflection and polarizing coatings, said means for converting said two separated parallel orthogonally polarized output beams into said single output beam comprising said beamsplitter/beam folder assembly means second set of regions and coatings.

38. A differential plane mirror interferometric system in accordance with claim 37 wherein said first and second regions of polarizing coatings comprise different portions of a common polarizing coating, said beamsplitter/beam folder assembly means comprising a common beamsplitter/beam folder assembly for converting said input beam and said output beam in said differential plane mirror interferometric system.

39. A differential plane mirror interferometric system in accordance with claim 38 wherein said common beamsplitter/beam folder assembly comprises beam entrance and exit surfaces, said first and second regions of antireflection coatings being on said entrance and exit surfaces.

40. A differential plane mirror interferometric system in accordance with claim 39 wherein said beamsplitter/beam folder assembly means comprises a right angle prism and a rhomboid prism.

41. A differential plane mirror interferometric system in accordance with claim 38 wherein said beamsplitter/beam folder assembly means comprises a right angle prism and a rhomboid prism.

42. A differential plane mirror interferometric system in accordance with claim 37 wherein said beamsplitter/beam folder assembly means comprises a right angle prism and a rhomboid prism.

43. A differential plane mirror interferometric system in accordance with claim 37 wherein said means for converting said two separated parallel orthogonally polarized beams into said two same polarized separated parallel beams comprises a half-wave retardation plate means.

44. A differential plane mirror interferometric system in accordance with claim 37 wherein said means for causing each of said separated parallel same polarized beams to be reflected twice by one of said pairs of plane mirrors comprises a polarizing beamsplitter means and a retroreflector means.

45. A differential plane mirror interferometric system in accordance with claim 44 wherein said means for causing each of said separated parallel same polarized beams to be reflected twice by one of said pairs of plane mirrors further comprises a quarter-wave retardation plate means.

46. A differential plane mirror interferometric system in accordance with claim 45 wherein said means for converting said two separated parallel same polarized output beams into said two separated parallel orthogonally polarized output beams comprises a half-wave retardation plate means.

47. A differential plane mirror interferometric system in accordance with claim 37 wherein said source means comprises a laser.

48. A differential plane mirror interferometric system in accordance with claim 37 wherein one of said pair of plane mirrors is fixed and comprises a reference mirror and the other of said pair of plane mirrors is movable for providing said variable distance between said pair of separable plane mirrors.

49. A differential plane mirror interferometric system in accordance with claim 48 wherein said source means comprises a laser.

50. A differential plane mirror interferometric system in accordance with claim 37 wherein all of said beams are optical beams, said optical beams being in a plurality of planes, with a given optical beam being in a given plane.

51. A differential plane mirror interferometric system in accordance with claim 50 wherein said source means comprises a laser.

52. A differential plane mirror interferometric system in accordance with claim 39 wherein the distance between said pair of plane mirrors is fixed for providing the variation in the index of refraction.

* * * * *